United States Patent
Sundararaj et al.

(10) Patent No.: US 11,356,010 B2
(45) Date of Patent: Jun. 7, 2022

(54) CONTROLLER WITH FREQUENCY REQUEST CIRCUIT

(71) Applicant: Power Integrations, Inc., San Jose, CA (US)

(72) Inventors: Sundaresan Sundararaj, Union City, CA (US); Zhao-Jun Wang, San Jose, CA (US); Tiziano Pastore, Los Gatos, CA (US); Lance M. Wong, Milpitas, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 99 days.

(21) Appl. No.: 16/871,522

(22) Filed: May 11, 2020

(65) Prior Publication Data
US 2021/0351685 A1  Nov. 11, 2021

(51) Int. Cl.
*H02M 1/08* (2006.01)
*H02M 3/335* (2006.01)
*H02M 3/156* (2006.01)

(52) U.S. Cl.
CPC ............ *H02M 1/08* (2013.01); *H02M 3/156* (2013.01); *H02M 3/33592* (2013.01)

(58) Field of Classification Search
None
See application file for complete search history.

(56) References Cited

U.S. PATENT DOCUMENTS

| | | |
|---|---|---|
| 6,249,876 B1 | 6/2001 | Balakrishnan et al. |
| 6,525,514 B1 | 2/2003 | Balakrishnan et al. |
| 7,233,504 B2 | 6/2007 | Djenguerian et al. |
| 7,518,885 B2 | 4/2009 | Baurle et al. |
| 7,923,973 B2 | 4/2011 | Odell |
| 8,004,262 B2 | 8/2011 | Saint-Pierre |
| 8,040,114 B2 | 10/2011 | Saint-Pierre |
| 8,098,503 B2 | 1/2012 | Gaknoki et al. |
| 8,102,683 B2 | 1/2012 | Gaknoki et al. |
| 8,242,766 B2 | 8/2012 | Gaknoki |
| 8,310,845 B2 | 11/2012 | Gaknoki |
| 8,611,116 B2 | 12/2013 | Baurle et al. |
| 8,693,217 B2 | 4/2014 | Mao |
| 9,112,425 B2 | 8/2015 | Prescott et al. |
| 9,166,486 B2 | 10/2015 | Matthews et al. |
| 9,271,352 B2 | 2/2016 | Mao et al. |

(Continued)

*Primary Examiner* — Jeffrey A Gblende
(74) *Attorney, Agent, or Firm* — Power Integrations, Inc.

(57) ABSTRACT

A controller comprising a regulation circuit and a frequency request circuit. The regulation circuit configured to receive a signal representative of an output and a reference representative of a desired value of the output, the regulation circuit configured to output a regulation signal in response to a difference between the signal and the reference. The frequency request circuit configured to receive the regulation signal and outputs an increment signal representative of a request to increase a switching frequency and a decrement signal representative of a request to decrease the switching frequency in response to the regulation signal. The frequency request circuit configured to assert the increment signal when the output is less than the desired value for a duration longer than a first period and assert the decrement signal when the output is greater than the desired value for a duration longer than a second period.

22 Claims, 6 Drawing Sheets

(56) References Cited

U.S. PATENT DOCUMENTS

| | | | |
|---|---|---|---|
| 9,602,013 B2* | 3/2017 | Pastore | H02M 1/4258 |
| 9,621,019 B2 | 4/2017 | Zhang et al. | |
| 9,793,813 B1* | 10/2017 | Marawi | H02M 3/33507 |
| 9,954,444 B1* | 4/2018 | Shu | H02M 3/33507 |
| 10,027,236 B1 | 7/2018 | Gaknoki et al. | |
| 10,033,284 B2 | 7/2018 | Werner et al. | |
| 10,243,442 B1 | 3/2019 | Balakrishnan et al. | |
| 10,418,908 B1 | 9/2019 | Pastore et al. | |
| 10,491,126 B1 | 11/2019 | Pastore et al. | |
| 10,505,458 B1 | 12/2019 | Pastore et al. | |
| 10,581,330 B2* | 3/2020 | Lee | H02M 3/07 |
| 10,585,444 B2 | 3/2020 | Pham et al. | |
| 2020/0195161 A1 | 6/2020 | Mayell et al. | |

* cited by examiner

CONTROLLER WITH FREQUENCY REQUEST CIRCUIT

BACKGROUND OF THE INVENTION

1. Field of the Invention

The present invention relates generally to power converters, and more specifically to switched mode power converters which are controlled by a controller.

2. Discussion of the Related Art

Many electronic devices, such as cell phones, laptops, etc., are powered by direct current (dc) power derived from a power supply. Conventional wall outlets generally deliver a high voltage alternating current (ac) power that is converted to regulated dc power in order to be used as a power source for consumer electronic devices. In some applications, a power conversion system may cascade one or more power converter stages including a power factor correction (PFC) stage. Switch mode power converters are commonly used due to their high efficiency, small size, and low weight to convert a high voltage ac power to a regulated dc power.

The switched mode power converter also includes at controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control. In one example, switched mode power converters are used to provide regulated power to light emitting diode (LED) devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
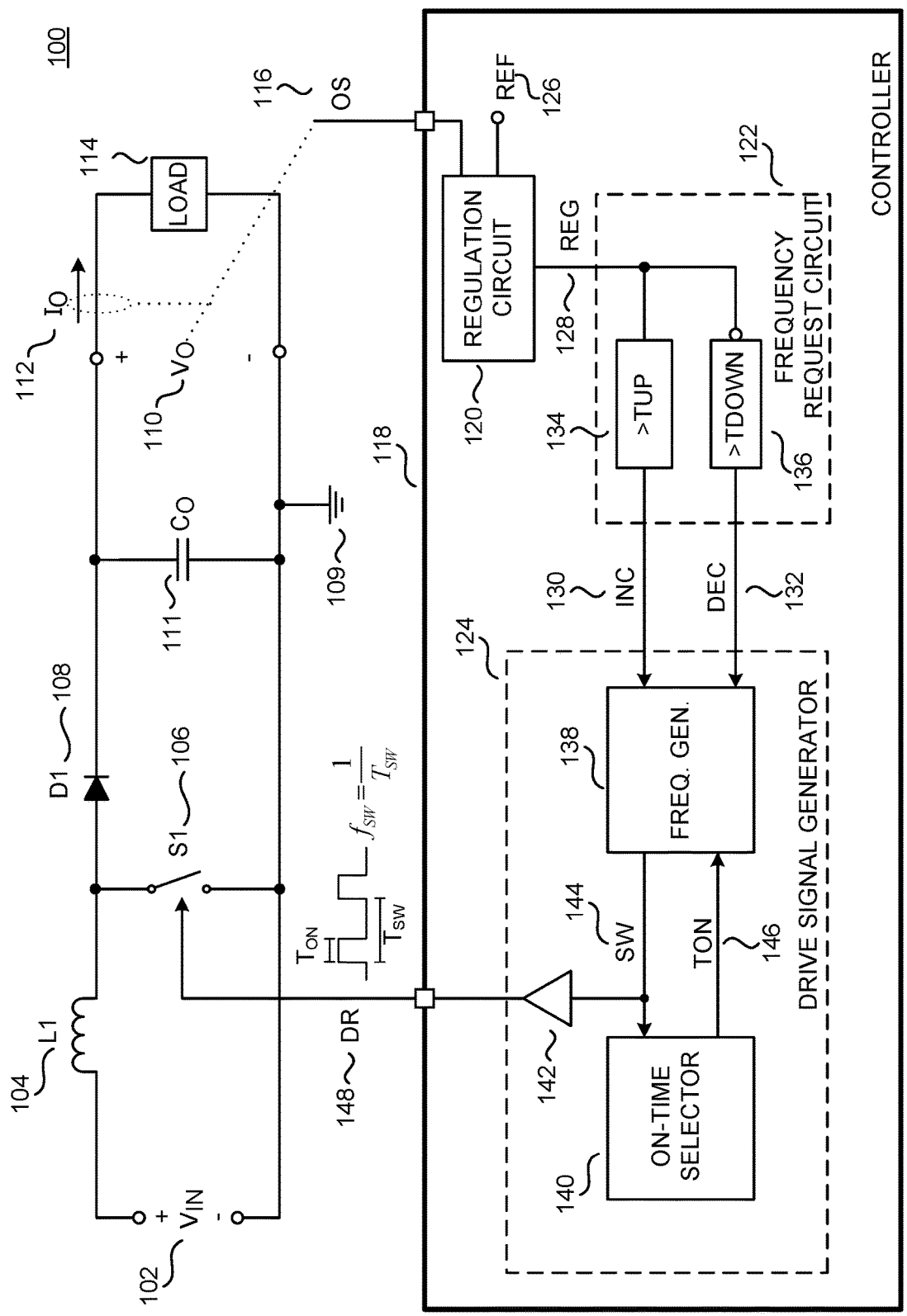
FIG. 1 is a functional block diagram of a power converter with a controller including a regulation circuit, a frequency request circuit, and a drive signal generator, in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power converters can use a controller to provide output regulation to an electrical device or load (such as an LED lamp for example) by sensing and controlling the output of the power converter. More specifically, the controller can be coupled to a sensor that provides information about the output of the power converter in order to regulate the output quantity delivered to the LED lamp (also referred to as a load). The controller regulates the output quantity delivered to the load by controlling a switch to turn on and off in response to the output sense information from the sensor to transfer energy pulses to the power converter output from a source of input power such as a power line. Further, the controller regulates the output quantity delivered in response to a comparison between the output sense information and a reference representative of the desired quantity of the output.

In LED lighting applications, the power converter regulates the output current to the LED lamp. For dimming applications, a dimming control signal representative of how much the power converter should dim the LED lamp is provided to the controller.

Dimming may be accomplished by varying the amount of current provided to the LED lamp. This may be accomplished by modifying the output sense information or the reference representative of the desired quantity of the output.

Many lighting applications include dimming requirements which are as low as 1% of the non-dimmed output. In addition, efficiency requirements are also increasing even at these low levels of dimming. To accomplish this level of dimming, the controller may reduce the reference representative of the desired quantity of the output which is compared to the output sense information to regulate (and/or dim) the output of the power converter. At these levels of dimming, the noise level can become significant and traditional control systems can become unstable, particularly if these control systems use high gain or high bandwidth control loops. Solutions generally include internal or external compensation circuits to the controller, but package size may limit the total number of pins for the controller, which limits the amount of compensation which can be used. As such, the instability of these control loops may cause visible shimmer at low dimming levels.

Embodiments of the present disclosure include a controller with a regulation circuit, frequency request circuit and a drive signal generator. The regulation circuit receives an output sense signal representative of an output quantity and a reference representative of a desired value for the output quantity and provides a regulation signal representative of whether the output sense signal is above or below the reference. The frequency request circuit receives the regulation signal and determines whether to request an increase or decrease of the frequency of the drive signal which controls the turn on and turn off of a power switch of a power converter.

Under steady state conditions, the regulation signal should toggle between a high or low state as the output is close to the desired quantity. In other words, the regulation signal should indicate that the output sense is below a reference for less than a first period of time (TUP) and the regulation signal should indicate the output sense is above the reference for less than a second period of time (TDOWN). It should be appreciated that the first and second period of time may be substantially equal. In embodiments, if the output sense is less than the reference for longer than the first period of time TUP, the frequency request circuit outputs a request to increase the switching frequency of the drive signal, which increases the rate at which the power switch is turned on and off. If the output sense is greater than the reference for longer than the second period of time TDOWN, the frequency request circuit outputs a request to decrease the switching frequency of the drive signal, which decreases the rate at which the power switch is turned on and off.

As will be discussed, the drive signal generator receives these requests and determines the frequency and the on-time of the drive signal. Further, the drive signal generator utilizes an on-time state machine which determines the on-time in response to the requested frequency. For example, each state of the on-time state machine sets a fixed on-time for the drive signal (and e.g. the on-time for the power switch). The state machine transitions states when the requested frequency has reached either a minimum or a maximum frequency for the current state. With embodiments of the present disclosure, the controller may avoid instability and shimmer at low dimming levels.

To illustrate, FIG. 1 shows a diagram of an example power converter 100 with a controller 118 including a regulation circuit 120, a frequency request circuit 122, and a drive signal generator 124, in accordance with embodiments of the present invention. For the example shown, the power converter 100 is controlled by the controller 118 to transfer energy from an input to an output of the power converter 100. The illustrated example of the power converter 100 includes an energy transfer element L1 104, a power switch S1 106, an output diode D1 108, a return 109, and output capacitor CO 111. The power converter 100 is shown as having a boost topology, however it is appreciated that other known topologies and configurations of power converters may also benefit from the teachings of the present disclosure. Further, the power converter 100 shown is a non-isolated power converter, but it should be appreciated that isolated power converters could also benefit from the teachings of the present disclosure. Even further, isolated power converters with one or more controllers to control one or more power switches of the isolated power converter could also benefit from the teachings of the present disclosure.

The controller 118 of FIG. 1 is also shown as including the regulation circuit 120, frequency request circuit 122, and drive signal generator 124. The frequency request circuit 122 includes an increase transition block 134 and a decrease transition block 136. The drive signal generator 124 includes a frequency generator 138, an on-time selector 140, and a driver 142. Also shown in FIG. 1 are an input voltage VIN 102, an output voltage Vo 110, an output current $I_O$ 112, an output sense signal OS 116, a reference REF 126, a regulation signal REG 128, an increment signal INC 130, a decrement signal DEC 132, a switching signal SW 144, an on-time signal TON 146, and a drive signal DR 148.

Power converter 100 provides output power to a load 114 from an unregulated input voltage VIN 102. In one example, the input voltage VIN 102 is a rectified and filtered ac line voltage. In another embodiment, the input voltage VIN 102 is a dc input voltage. The input VIN 102 is coupled to the energy transfer element L1 104. As shown, the energy transfer element L1 104 is an inductor. One end of the switch S1 106 is coupled between the energy transfer element L1 104 and the output diode D1 108, the other end of the switch S1 106 couples to the return 109. In one embodiment, the switch S1 106 may be a transistor such as a metal-oxide-semiconductor field-effect transistor (MOSFET), a bipolar junction transistor (BJT), a silicon carbide (SiC) based transistor, a gallium nitride (GaN) based transistor, or an insulated-gate bipolar transistor (IGBT). Further, the power switch S1 106 may comprise several transistors arranged in a cascode configuration, such as a high-voltage GaN based transistor and a low-voltage S1 based transistor.

Return 109 provides the point of lowest potential, or in other words the point of lowest voltage with respect to the input of the power converter 100. Output diode D1 108 further couples to the output capacitor CO 111 and the output of the power converter 100. The power converter 100 further includes circuitry to regulate the output, which in one example may be the output voltage Vo 110, output current $I_O$ 112, or a combination of the two. An output sense signal OS 116 representative of the output of the power converter 100 is provided to controller 118.

Controller 118 is coupled to receive the output sense signal OS 116 representative of the output of the power converter 100 and outputs the drive signal DR 148 to control the turn on and turn off the power switch S1 106. As will be further discussed, the controller 118 outputs the drive signal DR 148 to control the power switch S1 106 such that the regulation signal REG 128 transitions between two states within a fixed a period of time. In one example, the controller 118 may be formed as integrated circuit that is manufactured as either a hybrid or monolithic integrated circuit. The power switch S1 106 may also be integrated in the same integrated circuit as the controller 118 or could be formed on its own integrated circuit. Further, it should be appreciated that the controller 118 and the power switch S1 106 may be included in a single package or may be implemented in separate packages.

As shown, controller 118 includes the regulation circuit 120 which is coupled to receive the output sense signal OS 116 and reference REF 126. Reference REF126 is representative of the desired value for the output of the power converter 100. In other words, the reference REF 126 may be representative of the desired value for the output voltage Vo 110, output current $I_O$ 112, or a combination of the two. In one example, the reference REF 126 is a constant value. In another example, the reference REF 126 is a variable value. For the example of dimming applications, the value of the reference REF 126 may be varied to change the desired value for the output of the power converter 100. In one example, the lower the value for the reference REF 126, the lower the desired value for the output of the power converter 100.

Figure 2A:
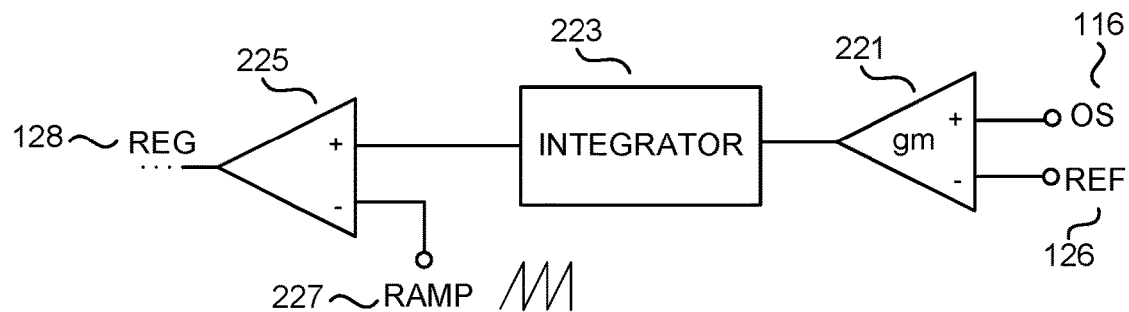
FIG. 2A is a schematic illustrating an example regulation circuit of FIG. 1, in accordance with embodiments of the present invention.
Figure 2B:
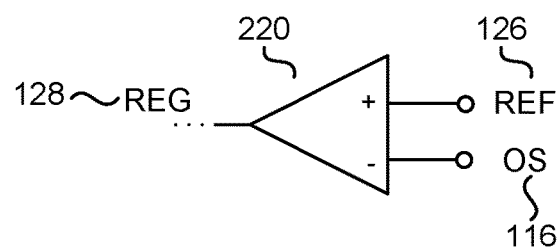
FIG. 2B is a schematic illustrating another example regulation circuit of FIG. 1, in accordance with embodiments of the present invention.

The regulation circuit 120 outputs the regulation signal REG 128 in response to the output sense signal OS 116 and reference REF 126. In other words, the regulation signal REG 128 is representative of a comparison between the output sense signal OS 116 and the reference REF 126. In particular, the regulation signal REG 128 indicates whether the output sense signal OS 116 is greater or less than the reference REF 126. As will be further shown, the regulation circuit 120 may be a high gain or high bandwidth pulse width modulation control circuit as shown in FIG. 2A or the regulation circuit 120 may be a comparator as shown in FIG. 2B. Since the regulation circuit 120 is a high gain or high bandwidth system, the regulation signal REG 128 toggles between two values to indicate whether. output sense signal OS 116 is greater or less than the reference REF 126. For example, the regulation signal REG 128 is a rectangular pulse waveform with varying lengths of logic high or logic low sections. Logic high sections may indicate that the reference REF 126 is greater than the output sense signal OS 116 while logic low sections indicate that the output sense signal OS 116 is less than the reference REF 126, or vice versa.

Frequency request circuit 122 is shown as configured to receive the regulation signal REG 128 and outputs the increment signal INC 130 and the decrement signal DEC 132. As shown, frequency request circuit 122 includes the increase transition block 134 and the decrease transition block 136. Increase transition block 134 is configured to receive the regulation signal REG 128 and output the increment signal INC 130. The increment signal INC 130 is representative of a request to increase the switching frequency of the drive signal DR 148. In operation, if the regulation signal REG 128 indicates that the output sense signal OS 116 is less than the reference REF 126 for longer than a first period TUP, the increase transition block 134 asserts the increment signal INC 130 to request an increase in the switching frequency. For example, a logic high value for the increment signal INC 130 indicates a request to increase the switching frequency while a logic low value is an indication of no request to increase the switching frequency.

Similarly, the decrease transition block 136 is configured to receive the regulation signal REG 128 and output the decrement signal DEC 132. The small circle at the input of the decrease transition block 136 indicates that, in one example, the decrease transition block 136 receives the inverted regulation signal REG 128. The decrement signal DEC 132 is representative of a request to decrease the switching frequency of the drive signal DR 148. In operation, if the regulation signal REG 128 indicates that the output sense signal OS 116 is greater than the reference REF 126 for longer than a second period TDOWN, the decrease transition block 136 asserts the decrement signal DEC 132 to request a decrease in the switching frequency. For example, a logic high value for the decrement signal DEC 132 indicates a request to decrease the switching frequency while a logic low value is an indication of no request to decrease the switching frequency. In some examples, both the increase transition block 134 and the decrease transition block 136 may include a timer (or counter) and a comparator to determine if the regulation signal REG 128 indicates that the output sense signal OS 116 is less than or greater the reference REF 126 for at least the first period TUP or the second period TDOWN, respectively. The duration of the first period TUP and the second period TDOWN may be determined by the bandwidth of the control loop. In one embodiment, the first period TUP and the second period TDOWN are substantially the same. Further, the first period TUP and the second period TDOWN may be trimmed or selected from one or more values and the selection may be based on the bandwidth of the control loop. In one embodiment, the first period TUP and the second period TDOWN may be substantially equal to 1 millisecond (ms), 2 ms, 4 ms, or 5 ms.

Drive signal generator 124 receives the increment signal INC 130 and the decrement signal DEC 132 and is configured to output the drive signal DR 148. As shown, the frequency generator 138 receives the increment signal INC 130 and the decrement signal DEC 132 and is configured to output the switching signal SW 144 in response to the increment signal INC 130 and the decrement signal DEC 132. In one embodiment, the frequency generator 138 determines the frequency of the switching signal SW 144 (and ergo the drive signal DR 148) in response to either the increment signal INC 130 or the decrement signal DEC 132. If the increment signal INC 130 is asserted, the frequency generator 138 increases the frequency of the switching signal SW 144. If the decrement signal DEC 132 is asserted, the frequency generator 138 decreases the frequency of the switching signal SW 144. Switching signal SW 144 is a rectangular pulse waveform with lengths of high and low sections which correspond to the on-time and off-time of the power switch S1 106. In one example, low sections correspond to the off-time of the power switch S1 106 while high sections correspond with the on-time of the power switch S1 106, or vice versa.

Driver 142 is coupled to receive the switching signal SW 144 and generates the drive signal DR 148 to turn on and turn off the power switch S1 106. drive signal DR 148 is a rectangular pulse waveform of high and low sections. In one example, high sections correspond to turning on the power switch S1 106 and low sections correspond to turning off the power switch S1 106. The frequency and period of the drive signal DR 148 is responsive to the frequency and the period of the switching signal SW 144. Further, the on-time indicated by the drive signal DR 148 is also response to the on-time of the switching signal SW 144. It should be appreciated that the switching period $T_{SW}$ of the drive signal DR 148 and switching signal SW 144 may be the time between consecutive rising edges or consecutive falling edges of the respective signals. Further, the switching frequency $f_{SW}$ is the reciprocal of the switching period, or mathematically:

$$f_{SW} = \frac{1}{T_{SW}}.$$

It should be appreciated that the properties of the drive signal DR 148 is substantially similar to the switching signal SW 144, however the high and low sections may vary in magnitude for the drive signal DR 148 as compared to the switching signal SW 144 depending on the drive characteristics of the power switch S1 106.

On-time selector 140 is configured to receive the switching signal SW 144 and outputs the on-time signal TON 146 in response to the switching frequency $f_{SW}$ (or period $T_{SW}$) of the switching signal SW 144. The on-time selector 140 is configured to determine the on-time $T_{ON}$ for both the switching signal SW 144 and drive signal DR 148. As will be further shown with respect to FIG. 4, the on-time selector 140 includes a state machine with at least two states. Each state corresponds to a value of the on-time $T_{ON}$ of the drive signal DR 148 and the switching signal SW 144. The on-time selector 140 transitions between the states in response to the value of the switching frequency $f_{SW}$ of the switching signal SW 144. If the switching frequency $f_{SW}$ of the switching signal SW 144 reaches a minimum frequency $f_{MIN}$ for the current state, the on-time selector 140 transitions to a state with a shorter on-time $T_{ON}$. If switching frequency $f_{SW}$ of the switching signal SW 144 reaches a maximum frequency $f_{MAX}$ for the current state, the on-time selector 140 transitions to a state with a longer on-time. For each state transition, the switching frequency $f_{SW}$ of the switching signal SW 144 is also adjusted by a parity factor N to maintain power parity between states due to the different on-times. For one example state machine, each state may have set an on-time which is double the previous states on-time. As such, the parity factor to substantially maintain power parity reduces the switching frequency by a factor of four when transitioning to a state with an on-time that is double the previous on-time or increase the switching frequency by a factor of four when transition to a state with an on-time that is half the previous on-time for a power converter 100 with a boost topology. For that example, the parity factor is substantially equal to four. The on-time selector 140 outputs the on-time signal TON 146, representative of the on-time determined by the state machine, to the frequency generator 138. The frequency generator 138 outputs the switching signal SW 144 with an on-time provide by the on-time selector 140 via the on-time signal TON 146. Further, the frequency generator 138 may adjust the switching frequency $f_{SW}$ of the switching signal SW 144 to maintain power parity as discussed above.

In operation, the regulation signal REG 128 indicates whether the output provided by the output sense signal OS 116 is greater or less than the reference REF 126. If the output sense signal OS 116 is less than the reference REF 126 for longer than a first period TUP, the increase transition block 134 asserts the increment signal INC 130 to increase the switching frequency $f_{SW}$ of the switching signal SW 144 and drive signal DR 148. If the output sense signal OS 116 is greater than the reference REF 126 for longer than a second period TDOWN, the decrease transition block 136 asserts the decrement signal DEC 132 to decrease the switching frequency $f_{SW}$ of the switching signal SW 144 and drive signal DR 148. The frequency generator 138 increases or decreases the switching frequency $f_{SW}$ of the switching signal SW 144 in response to asserted increment signal INC 130 or decrement signal DEC 132, respectively. The increase or decrease of the switching frequency $f_{SW}$ of the switching signal SW 144 may occur continually or may occur as a series of decreasing step functions. Further, the increase or decrease may be linear or exponential. The on-time selector 140 determines the on-time of the switching signal SW 144 (and ergo the drive signal DR 148) in response to the switching frequency $f_{SW}$ of the switching signal SW 144. If the switching frequency $f_{SW}$ of the switching signal SW 144 reaches a minimum frequency $f_{MIN}$, the on-time is reduced. If the switching frequency $f_{SW}$ of the switching signal SW 144 reaches a maximum frequency $f_{MAX}$, the on-time is increased. For increases or decreases in the on-time $T_{ON}$, the switching frequency is either reduced or increased to maintain consistent power parity for the power converter 100. As such, the controller 118 with a frequency request circuit 122 may reduce instability and reduce shimmer for a power converter 100.

FIG. 2A illustrates regulation circuit 220, which is one example of regulation circuit 120 shown in FIG. 1. It should be appreciated that similarly named and numbered elements couple and function as described above. The regulation circuit 220 shown in FIG. 2A includes a transconductance amplifier 221, integrator 223, and comparator 225. The example regulation circuit 220 may be one example of PWM regulation in that the difference between the output sense signal OS 116 and the reference REF 126 determines the duration of logic high and low sections of the regulation signal REG 128. Further, in one example, the gain or bandwidth of the regulation circuit 220 may be selected to be high enough such that any difference between the output sense signal OS 116 and the reference REF 126 would initiate a transition in the regulation signal REG 128.

Transconductance amplifier 221 is coupled to receive the output sense signal OS 116 and the reference REF 126. For the example shown, the transconductance amplifier 221 receives the output sense signal OS 116 at its non-inverting input and the reference REF 126 at its inverting input. The output of the transconductance amplifier is a current signal representative of the difference between the output sense signal OS 116 and the reference REF 126 multiplied by a gain factor gm. In one example, the gain for the transconductance amplifier 221 may be high such that the transconductance amplifier 221 saturates to either its minimum or maximum output depending on the whether the output sense signal OS 116 is greater or less than the reference REF 126. Integrator 223 is configured to receive the output current of the transconductance amplifier 221 and outputs a voltage signal. The voltage signal output from the integrator 223 is representative of the difference between the output sense signal OS 116 and the reference REF 126.

Comparator 225 is configured to receive the output of the integrator 223 and a ramp signal RAMP 227. As shown, comparator 225 is coupled to receive the output of integrator 223 at its non-inverting input and the ramp signal RAMP 227 at its inverting input. The output of comparator 225 is the regulation signal REG 128. If the output of the integrator 223 is greater than the ramp signal RAMP 227, the regulation signal REG 128 is a logic high value and if the output of the integrator 223 is less than the ramp signal RAMP 227, the regulation signal REG 128 is logic low. For the example shown, the regulation signal REG 128 is a fixed frequency PWM signal and the duty ratio is representative of the difference between output sense OS 116 and reference REF 123. For a PWM regulation circuit 220, the value of the regulation signal REG 128 would correspond with the on-time or the duty cycle of the drive signal DR 148. However, since the regulation circuit 220 is a high gain/ bandwidth system, the regulation signal REG 128 toggles between its minimum and maximum value, corresponding to the minimum or maximum on-time or duty ratio. As such, the regulation signal REG 128 corresponds to whether the output sense signal OS 116 is above or below the reference REF 126.

In operation, the regulation signal REG 128 changes value to a logic high or logic low in response to differences between the output sense signal OS 116 and the reference REF 126. For the example shown, the regulation signal REG 128 is logic high when output sense signal OS 116 is less than the reference REF 126 and logic low when the output sense signal OS 116 is greater than the reference REF 126. As such, a logic high value in the regulation signal REG 128 indicates that the output of the power converter 100 is less than a desired value for the output while a logic low value indicates that the output of the power converter 100 is greater than a desired value for the output.

Under steady state conditions, the regulation signal REG 128 should toggle between a high or low state as the output is close to the desired quantity. In other words, the regulation signal REG 128 should indicate that the output sense signal OS 116 is below reference REF 126 for less than the first period TUP and the regulation signal REG 128 should indicate the output sense signal is above the reference REF 126 for less than the second period TDOWN. It should be appreciated that the first and second period of time may be substantially equal.

If the regulation signal REG 128 indicates that the output of the power converter 100 is less than the desired value for longer than a first period TUP, the frequency request circuit 122 requests to increase the switching frequency $f_{SW}$ of the drive signal DR 148. An increase in the switching frequency $f_{SW}$ would increase the rate at which the power switch S1 106 is turned on and off. If the regulation signal REG 128 indicates that the output of the power converter 100 is greater than the desired value for longer than a second period TDOWN, the frequency request circuit 122 requests to decrease the switching frequency $f_{SW}$ of the drive signal DR 148. A decrease in the switching frequency $f_{SW}$ would decrease the rate at which the power switch S1 106 is turned on and off.

FIG. 2B illustrates another example regulation circuit 220, which is one example of regulation circuit 120 shown in FIG. 1. It should be appreciated that similarly named and numbered elements couple and function as described above. For the example shown, the regulation circuit 220 is exemplified by a comparator 220 which is configured to receive reference REF 126 and output sense signal OS 116. As shown, the comparator 220 receives the reference REF 126 at its non-inverting input and the output sense signal OS 116 at its inverting input. The output of comparator 220 is the regulation signal REG 128.

In operation, the regulation signal REG 128 is logic high when output sense signal OS 116 is less than the reference REF 126 and logic low when the output sense signal OS 116 is greater than the reference REF 126. As such, a logic high value in the regulation signal REG 128 indicates that the output of the power converter 100 is less than a desired value for the output while a logic low value indicates that the output of the power converter 100 is greater than a desired value for the output.

Under steady state conditions, the regulation signal REG 128 should toggle between a high or low state as the output is close to the desired quantity. In other words, the regulation signal REG 128 should indicate that the output sense signal OS 116 is below reference REF 126 for less than the first period TUP and the regulation signal REG 128 should indicate the output sense signal is above the reference REF 126 for less than the second period TDOWN. It should be appreciated that the first and second period of time may be substantially equal.

If the regulation signal REG 128 indicates that the output of the power converter 100 is less than the desired value for longer than a first period TUP, the frequency request circuit 122 requests to increase the switching frequency $f_{SW}$ of the drive signal DR 148. An increase in the switching frequency $f_{SW}$ would increase the rate at which the power switch S1 106 is turned on and off. If the regulation signal REG 128 indicates that the output of the power converter 100 is greater than the desired value for longer than a second period TDOWN, the frequency request circuit 122 requests to decrease the switching frequency $f_{SW}$ of the drive signal DR 148. A decrease in the switching frequency $f_{SW}$ would decrease the rate at which the power switch S1 106 is turned on and off.

Figure 3:
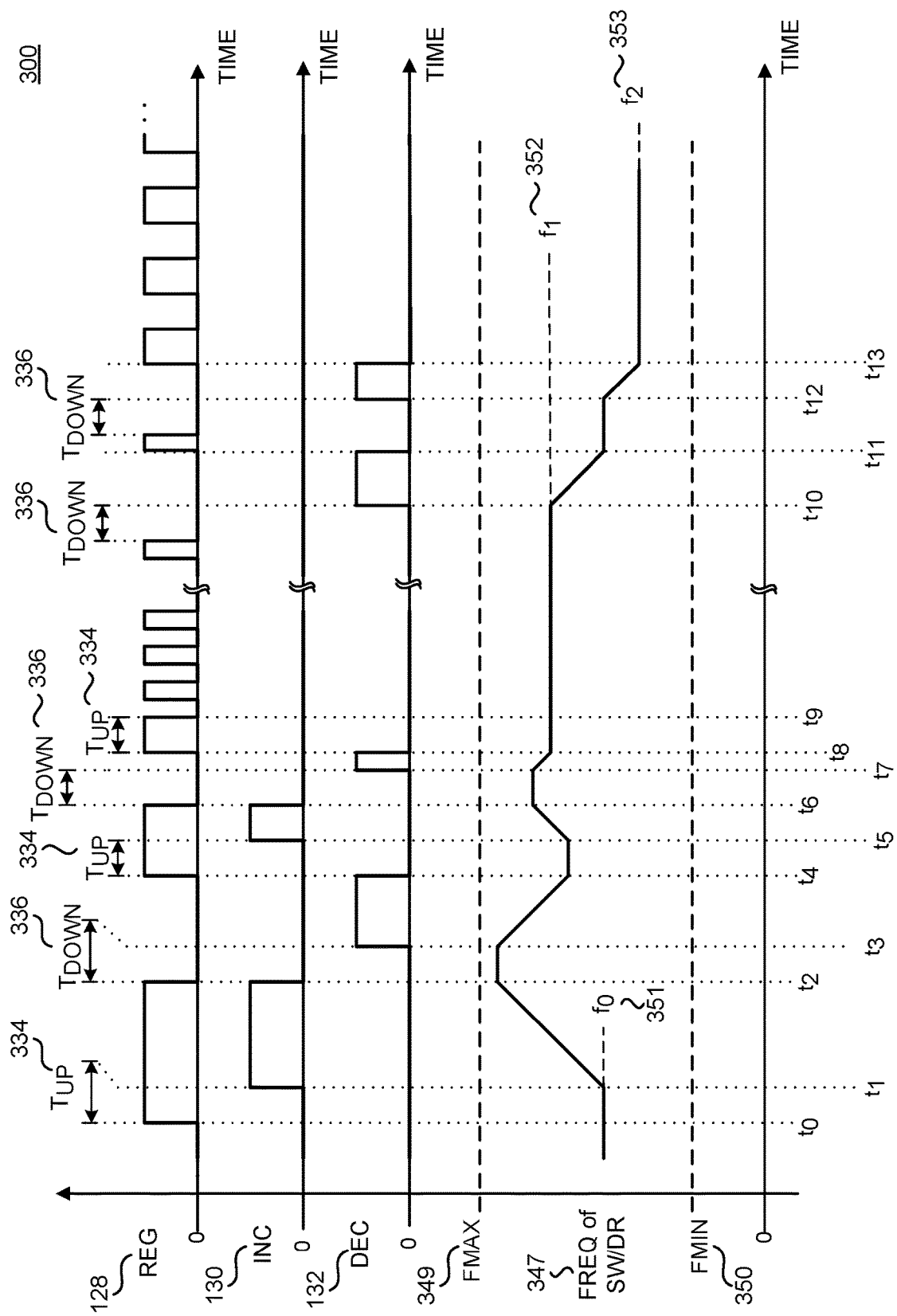
FIG. 3 is a timing diagram illustrating example waveforms of FIG. 1, in accordance with embodiments of the present invention.

FIG. 3 illustrates a timing diagram 300 of the regulation signal REG 128, increment signal INC 130, decrement signal DEC 132. Further, the value of the frequency $f_{SW}$ 347 of the switching signal SW 144 and the drive signal DR 148 over time is also shown. For the example shown, the regulation signal REG is a variable frequency signal, however it should be appreciated that the example regulation signal REG 128 may also be a fixed frequency signal.

At time $t_0$, the regulation signal REG 128 transitions to a logic high value indicating that the reference REF 126 is greater than the output sense signal OS 116, or in other words, the output of the power converter 100 is less than the desired value. As shown, both the increment signal INC 130 and the decrement signal DEC 132 are logic low, indicating these signals are not yet asserted and the switching frequency $f_{SW}$ 347 of the switching signal SW 144 and/or the drive signal DR 148 remains at its initial value $f_0$ 351.

At time $t_1$, the regulation signal REG 128 has remained logic high for the first period TUP 334, indicating that the output of the power converter 100 is less than the desired value for greater than the first period TUP 334. As such, increment signal INC 130 is asserted. For the example shown, the increment signal INC 130 transitions to a logic high value. Decrement signal DEC 132 remains unasserted and logic low. In response to the increment signal INC 130, the switching frequency $f_{SW}$ 347 of the switching signal SW 144 and/or the drive signal DR 148 increases from its initial value $f_0$ 351. As shown, the switching frequency $f_{SW}$ 347 continues to increase until the increment signal INC 130 is not asserted (e.g. transitions to a logic low value) at time $t_2$. However, the switching frequency $f_{SW}$ 347 could also be reduced by the parity factor N if the switching frequency $f_{SW}$ 347 reaches the maximum frequency FMAX 349. In one example, if the switching frequency $f_{SW}$ 347 reaches the maximum frequency FMAX 349, the drive signal generator 124 via the on-time selector 140 transitions to the next state with a longer on-time TON for the switching signal SW 144 and the drive signal DR 148 and the switching frequency $f_{SW}$ 347 is reduced by the parity factor N. In one example, maximum frequency FMAX 349 may be substantially equal to 100 kHz. The maximum frequency FMAX 349 may be selected due to the resolution of the design. Further, the maximum frequency FMAX 349 may be selected such that the increase in switching frequency $f_{SW}$ 347 provides less than 1% additional power to the output of the power converter.

At time $t_2$, the regulation signal REG 128 transitions to a logic low value, indicating that the output sense signal OS 116 is greater than the reference REF 126, or in other words, the output of the power converter 100 is greater than the desired value. The increment signal INC 130 is deasserted and transitions to the logic low value. Decrement signal DEC 132 remains deasserted as the second period TDOWN 336 has not yet elapsed. Further, the switching frequency $f_{SW}$ 347 remains constant at the value it reached at time $t_2$.

At time $t_3$, the regulation signal REG 128 has remained logic low for the second period TDOWN 336, indicating that the output of the power converter 100 is greater than the desired value for greater than the second period TDOWN 336. As such, decrement signal DEC 132 is asserted. For the example shown, the decrement signal DEC 132 transitions to a logic high value. Increment signal INC 130 remains unasserted and logic low. In response to the decrement signal DEC 132, the switching frequency $f_{SW}$ 347 of the switching signal SW 144 and/or the drive signal DR 148 decreases. As shown, the switching frequency $f_{SW}$ 347 continues to decrease until the decrement signal DEC 132 is not asserted (e.g. transitions to a logic low value) at time $t_4$. However, the switching frequency $f_{SW}$ 347 could also be increased by the parity factor N if the switching frequency $f_{SW}$ 347 reaches the minimum frequency FMIN 350. In one example, if the switching frequency $f_{SW}$ 347 reaches the minimum frequency FMIN 350, the drive signal generator 124 via the on-time selector 140 transitions to the next state with a shorter on-time TON for the switching signal SW 144 and the drive signal DR 148 and the switching frequency $f_{SW}$ 347 is increased by the parity factor N. In one example, the minimum frequency FMIN 350 may be substantially equal to 18 kHz. The minimum frequency FMIN 350 may be selected to avoid audible noise ranges.

At time $t_4$, the regulation signal REG 128 transitions to a logic high value, indicating that the output sense signal OS 116 is less than the reference REF 126, or in other words, the output of the power converter 100 is less than the desired value. The decrement signal DEC 132 is deasserted and transitions to the logic low value. Increment signal INC 130 remains deasserted as the first period TUP 334 has not yet elapsed. Further, the switching frequency $f_{SW}$ 347 remains constant at the value it reached at time $t_4$.

Similar to time $t_1$, at time $t_5$ the regulation signal REG 128 has remained logic high for the first period TUP 334 and the increment signal INC 130 is asserted. Decrement signal DEC 132 remains unasserted and logic low. In response to the increment signal INC 130, the switching frequency $f_{SW}$ 347 increases from its value at time $t_4$. As shown, the switching frequency $f_{SW}$ 347 continues to increase until the increment signal INC 130 is not asserted at time $t_6$.

Similar to time $t_2$, at time $t_6$ the regulation signal REG 128 transitions to a logic low value, indicating that the output sense signal OS 116 is greater than the reference REF 126. The increment signal INC 130 is deasserted and transitions to the logic low value. Decrement signal DEC 132 remains deasserted as the second period TDOWN 336 has not yet elapsed. Further, the switching frequency $f_{SW}$ 347 remains constant at the value it reached at time $t_6$.

Similar to time $t_3$, at time $t_7$ the regulation signal REG 128 has remained logic low for the second period TDOWN 336 and the decrement signal DEC 132 is asserted. Increment signal INC 130 remains unasserted and logic low. In response to the decrement signal DEC 132, the switching frequency $f_{SW}$ 347 of the switching signal SW 144 and/or the drive signal DR 148 decreases. As shown, the switching frequency $f_{SW}$ 347 continues to decrease until the decrement signal DEC 132 is not asserted at time $t_8$.

At time $t_8$, the regulation signal REG 128 transitions to a logic high value, indicating that the output sense signal OS 116 is less than the reference REF 126. The decrement signal DEC 132 is deasserted and transitions to the logic low value. Increment signal INC 130 remains deasserted as the first period TUP 334 has not yet elapsed. Further, the switching frequency $f_{SW}$ 347 remains constant at the value it reached at time $t_8$.

At time $t_9$, the regulation signal REG 128 transitions to a logic low value indicating that the output sense signal OS 116 is greater than the reference REF 126. The increment signal INC 130 remains deasserted since the regulation signal REG 128 was not logic high for a duration of time which exceeded the first period TUP 334. As shown in FIG. 3, after time $t_9$ and before time $t_0$, the regulation signal REG 128 is toggling between logic high and logic low values. However, the durations in which the regulation signal REG 128 is logic high do not exceed the first period TUP 334 and the durations which the regulation signal REG 128 is logic low do not exceed the second period TDOWN 336. As such, neither the increment signal INC 130 nor the decrement signal DEC 132 are asserted and the switching frequency $f_{SW}$ 347 remains at value $f_1$ 352, which is the value the switching frequency $f_{SW}$ 347 reached at time $t_8$. For this example, the value $f_1$ 352 is greater than the initial value $f_0$ 351.

At time $t_{10}$, the decrement signal DEC 132 is once again asserted as the regulation signal REG 128 is logic low for a duration greater than the second period TDOWN 336 and the switching frequency $f_{SW}$ 347 decreases from value $f_1$ 352.

At time $t_{11}$, the decrement signal DEC 132 is deasserted when the regulation signal REG 128 transitions to a logic high value. As shown, the regulation signal REG 128 transitions to a logic low value before the first period TUP 334 has elapsed and the increment signal INC 130 remains deasserted. The switching frequency $f_{SW}$ 347 remains constant at the value it reached at time $t_{11}$.

At time t12, the decrement signal DEC 132 is once again asserted as the regulation signal REG 128 is logic low for a duration greater than the second period TDOWN 336 and the switching frequency $f_{SW}$ 347 decreases from the value which switching frequency $f_{SW}$ 347 reached at time $t_{11}$.

At time t13, the decrement signal DEC 132 is again deasserted when the regulation signal REG 128 transitions to a logic high value. The switching frequency $f_{SW}$ 347 remains constant at the value it reached at time t13, shown as value $f_2$ 353. After time t13, the regulation signal REG 128 toggles between logic high and logic low values and the durations in which the regulation signal REG 128 is logic high do not exceed the first period TUP 334 and the durations which the regulation signal REG 128 is logic low do not exceed the second period TDOWN 336. As such, neither the increment signal INC 130 nor the decrement signal DEC 132 are asserted and the switching frequency $f_{SW}$ 347 remains at value $f_2$ 353, which is the value the switching frequency $f_{SW}$ 347 reached at time t13. For this example, the value $f_2$ 353 is lower than the initial value $f_0$ 351.

Figure 4:
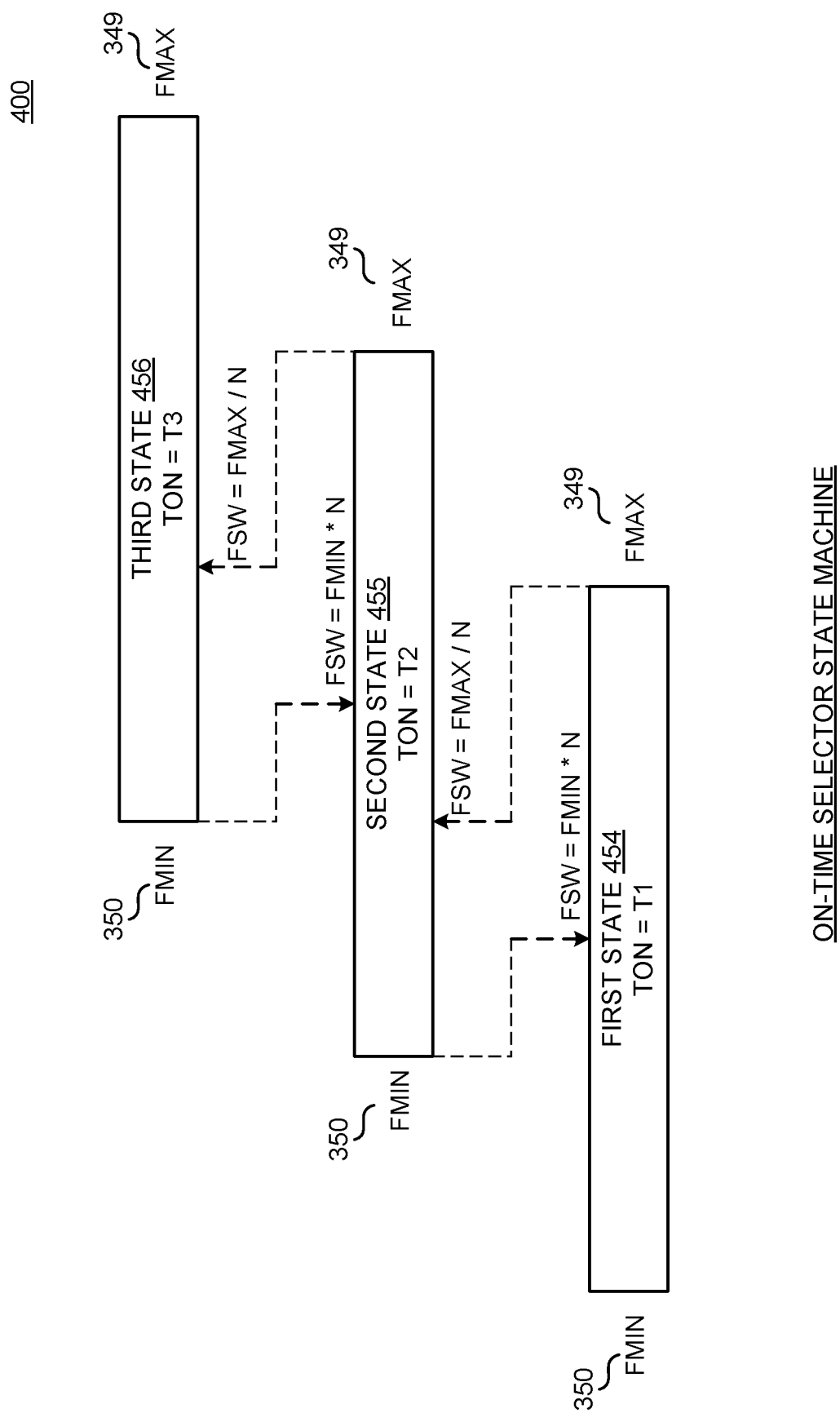
FIG. 4 is a state machine of the controller of FIG. 1, in accordance with embodiments of the present invention.

FIG. 4 illustrates state machine 400, which is one example state machine implemented by the on-time selector 140 of FIG. 1. State machine 400 is shown as including three states: first state 454, second state 455, and third state 456. However, it should be appreciated that two or more states could be utilized. Each state sets a fixed on-time TON for the switching signal SW 144 for a range of switching frequencies fSW between a minimum frequency FMIN 350 and a maximum frequency FMAX 349, which results in the on-time for the drive signal DR 148 and power switch S1 106 at the determined frequency.

First state 454 sets the on-time for the switching signal SW 144, and ergo the drive signal DR 148 and power switch S1 106 to a first on-time T1. If the switching frequency $f_{SW}$ of the switching signal SW 144 is between the minimum frequency FMIN 350 and the maximum frequency FMAX 349, the on-time selector 140 remains at the first state 454. However, if the switching frequency $f_{SW}$ of the switching signal SW 144 reaches the maximum frequency FMAX 349, the on-time selector 140 transitions to the second state 455.

Second state 455 sets the on-time for the switching signal SW 144, and ergo the drive signal DR 148 and power switch S1 106 to a second on-time T2. In one example, the second on-time T2 is greater than the first on-time T1. Further, the second on-time T2 may be double the first on-time T1. For state transitions, the frequency generator 138 varies the switching frequency $f_{SW}$ of the switching signal SW 144 in response to the on-time TON provided by the on-time selector 140. In other words, the frequency generator 138 varies the switching frequency $f_{SW}$ of the switching signal SW 144 in response to the state of the on-time selector 140. For the example shown, when transitioning to states with a longer on-times, the switching frequency $f_{SW}$ is reduced by a parity factor of N. For the transition from the first state 454 to the second state 455, the switching frequency $f_{SW}$ is set to the maximum frequency FMAX 349 divided by the parity factor N. It should be appreciated that the value selected for the parity factor N is at least in part dependent on the value selected for the maximum frequency FMAX 349 and the selected on-times for each state. For the example shown, the on-times TON for each state double as compared to the previous state. As such, the parity factor would be substantially equal to four. Further, the parity factor N is selected to maintain power parity for the output of the power converter 100 when transitioning between states.

The state machine 400 returns to the first state 454 from the second state 455 if the switching frequency $f_{SW}$ reaches the minimum frequency FMIN 350 while in the second state 455. As previously mentioned, the first state 454 sets the on-time for the switching signal SW 144 to the first on-time T1. Further, for transitioning to states with shorter on-times, the switching frequency $f_{SW}$ is increased by a parity factor of N. For the transition from the second state 455 to the first state 454, the switching frequency $f_{SW}$ is set to the minimum frequency FMIN 350 multiplied by the parity factor N.

The state machine 400 transitions to the third state 456 from the second state 455 if the switching frequency $f_{SW}$ reaches the maximum frequency FMAX 349 while in the second state 455. The third state 456 sets the on-time for the switching signal SW 144, and ergo the drive signal DR 148 and power switch S1 106 to a third on-time T3. In one example, the third on-time T3 is greater than the second on-time T12, which is greater than the first on-time T1. Further, the third on-time T2 may be double the second on-time T2, and quadruple the first on-time T1. For the transition from the second state 455 to the third state 456, the switching frequency $f_{SW}$ is set to the maximum frequency FMAX 349 divided by the parity factor N.

The state machine 400 returns to the second state 455 from the third state 456 55 if the switching frequency $f_{SW}$ reaches the minimum frequency FMIN 350 while in the third state 456. As previously mentioned, the second state 455 sets the on-time for the switching signal SW 144 to the second on-time T2. Further, for transitioning to states with shorter on-times, the switching frequency $f_{SW}$ is increased by a parity factor of N. For the transition from the third state 456 to the second state 455, the switching frequency $f_{SW}$ is set to the minimum frequency FMIN 350 multiplied by the parity factor N. For the example shown, the values for the minimum frequency FMIN 350 and the maximum frequency FMAX 349 are substantially the same for each state. However, it should be appreciated that each state could be capped by different values for the minimum frequency FMIN and the maximum frequency FMAX. In addition, there may be a difference between the minimum frequency FMIN and the maximum frequency FMAX 349 divided by the parity value N (e.g. FMAX/N) to provide hysteresis to stabilize the state machine.

Figure 5:
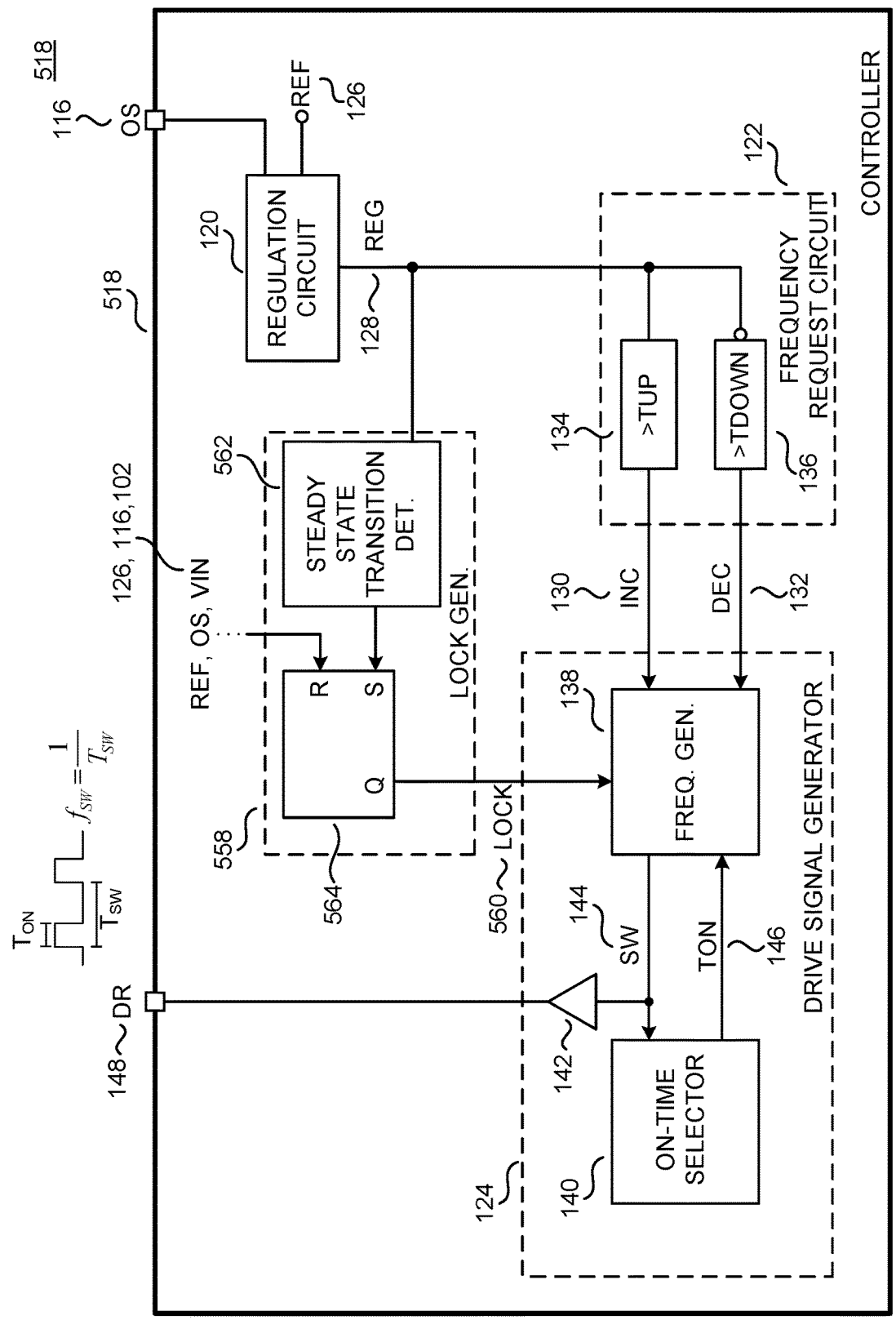
FIG. 5 is a functional block diagram of another example controller including the regulation circuit, the frequency request circuit, the drive signal generator, and a lock signal generator, in accordance with embodiments of the present invention.

FIG. 5 illustrates another example controller 518 which includes the regulation circuit 120, frequency request circuit 122, and drive signal generator 124. It should be appreciated that similarly named and numbered elements couple and function as described above. At least one difference, however, is the controller 518 also includes a lock generator circuit 558 which is configured to receive the regulation signal REG 128 from the regulation circuit 120 and outputs a lock signal LOCK 560 to the drive signal generator 124. The lock generator circuit 558 is also configured to receive one or more of the reference REF 126, output sense signal OS 116, or the input voltage VIN 102 of the power converter 100. In embodiments, the lock generator circuit 558 is configured to monitor the regulation signal REG 128 and at least one or more of the reference REF 126, output sense signal OS 116, or the input voltage VIN 102 to determine if the lock signal LOCK 560 should be asserted. The lock signal LOCK 560 is representative of locking or holding the value of the switching frequency $f_{SW}$ determined by the frequency generator 138 of the drive signal generator 124. An asserted lock signal LOCK 560 would lock or hold the value of the switching frequency $f_{SW}$ determined by the frequency generator 138 regardless of whether the increment signal INC 130 or the decrement signal DEC 132 is asserted.

In one example, the lock generator circuit 558 includes a steady state transition detection circuit 562 and a latch 564. The steady state transition detection circuit 562 is configured to receive the regulation signal REG 128 and output a signal to the set-input of latch 564. The signal outputted by the steady state transition detection circuit 562 is representative of determining that the controller 518 and power converter 100 has reached a steady state condition. For the example illustrated, the steady state transition detection circuit 562 monitors the regulation signal REG 128 to determine whether the controller 518 and power converter 100 has reached a steady state condition. In one embodiment, the steady state transition detection circuit 562 determines that the power converter 100 is in steady state if the regulation signal REG 128 transitions between the logic high and logic low sections within the first period TUP and the second period TDOWN. Further, the steady state transition detection circuit 562 determines that the power converter 100 is in steady state if the regulation signal REG 128 transitions between the logic high and logic low sections within the first period TUP and the second period TDOWN for at least a fixed period of time. Once the steady state transition detection circuit 562 determines that the power converter 100 is in a steady state condition, the steady state transition detection circuit 562 outputs a signal to set the latch 564 which asserts the lock signal LOCK 560 to lock or hold the frequency generator 138.

The lock signal LOCK 560 is deasserted and unlocks or unholds the frequency generator 138 in response to one or more of the reference REF 126, output sense signal OS 116, or the input voltage VIN 102. As shown, the reset-input of latch 564 is configured to receive one or more of the reference REF 126, output sense signal OS 116, or the input voltage VIN 102. In operation, if a change in either the reference REF 126, output sense signal OS 116, or the input voltage VIN 102 occurs, the latch 564 is reset and the lock signal LOCK 560 is deasserted. It should be appreciated that if the lock generator circuit 558 is not configured to receive the output sense signal OS 116 or the input voltage VIN 102, only a change in the reference REF 126 would reset the latch 564 and vice versa for the other signals. However, in one embodiment the latch 564 receives all three signals to determine if the lock signal LOCK 560 should be deasserted. In another embodiment, the lock signal LOCK 560 is initially asserted and unlocks if the reference REF 126 changes. In one example, the reference REF 126 varies due to a change in the dimming level of the output.

Figure 6:
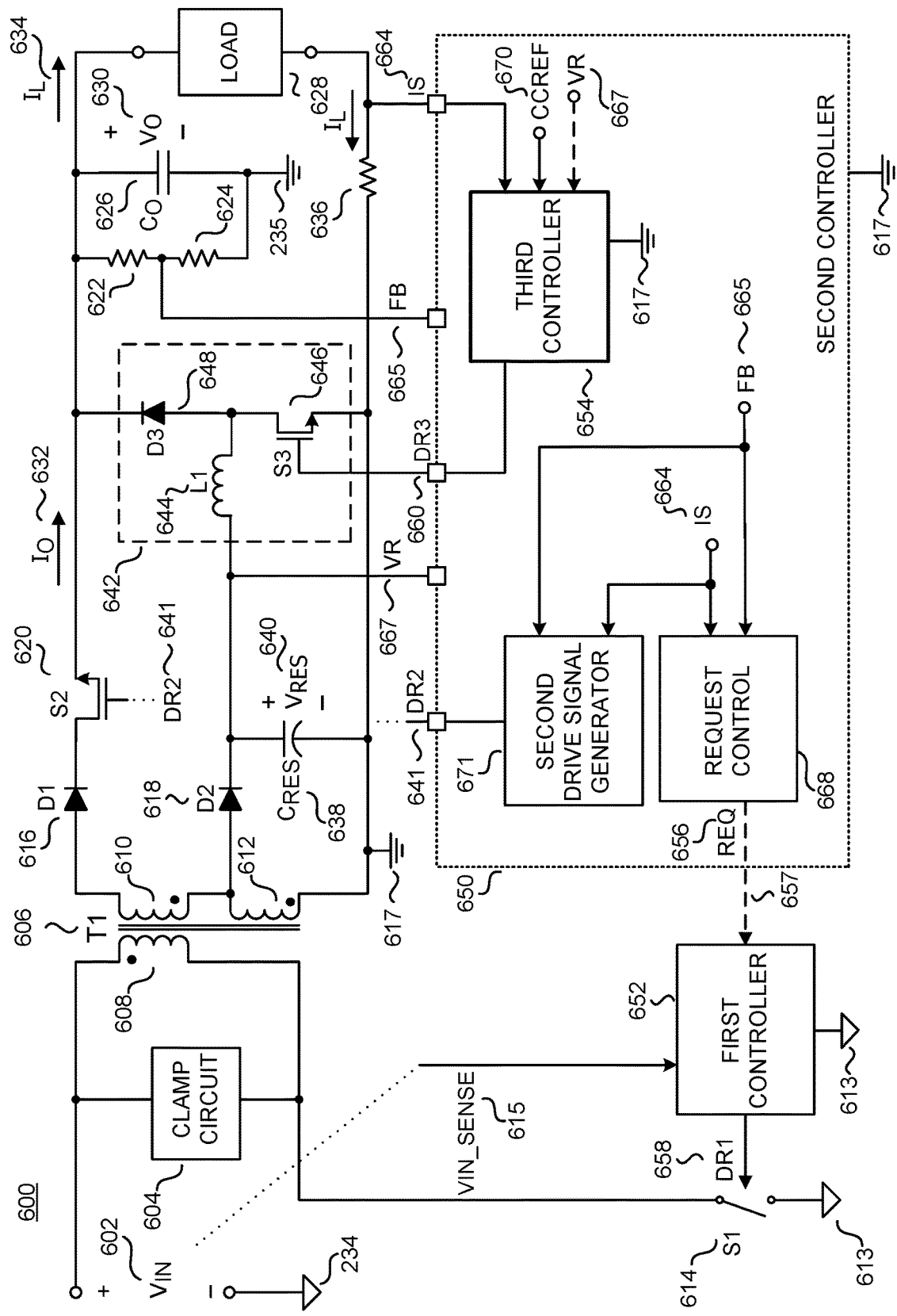
FIG. 6 is a functional block diagram of another example power converter with a controller including a regulation circuit, a frequency request circuit, and a drive signal generator, in accordance with embodiments of the present invention.

FIG. 6 illustrates another example power converter 100 which includes a third controller 654 in accordance with the embodiments disclosed. For the example shown, the third controller 654 is shown as receiving a load current sense signal IS 664, constant current reference CCREF 670, and a sensed reservoir voltage VR 667 and outputs a third drive signal DR3 660 to control a third power switch S3 646 of a regulator circuit 642. It should be appreciated that the third controller 654 is one example of the controller 118 or controller 518 as discussed above and includes at least the regulation circuit, frequency generator and the drive signal generator as discussed above. Further, the load current sense signal IS 664 is one example of the output sense signal OS 116, the constant current reference CCREF 670 is one example of reference REF 126, the sensed reservoir voltage VR 667 is one example of the input voltage VIN 102, the third drive signal DR3 660 is one example of drive signal DR 148, the third power switch S3 646 is one example of power switch S1 106, and regulator circuit 642 is one example of power converter 100 as shown and discussed with respect to in FIGS. 1, 2A, 2B, 3, 4 and 5. As such, it should be appreciated that the third controller 654 is configured and functions as discussed above in accordance with the embodiments of the present disclosure.

Power converter 600 of FIG. 6 includes a first controller 652 and a second controller 650. Further, the second controller includes the third controller 654. The power converter 600 as shown is a multi-output power converter which provides energy from an input to a first output and second output. Further, the power converter 600 is a multi-output power converter with isolation. The power converter 600 has a primary (e.g., input) side and a secondary (e.g., output) side, which are galvanically isolated from each other. As shown, circuitry on the primary side of the power converter 600 are referenced to input return 613 while circuitry on the secondary side are referenced to output return 617. An energy transfer element T1 606 transfers energy and provides galvanic isolation between the primary side and the secondary side. For the example shown, the first controller 652 is referenced to input return 613 and controls a first power switch S1 614 on the primary side of the power converter 600. Second controller 650 and the third controller 654 are referenced to output return 617 and controls a second switch S2 and the third switch S3 660, respectively, on the secondary side of the power converter 600.

Power converter 600 provides output power to the load 628 from an unregulated input voltage $V_{IN}$ 602, which in one example is a rectified ac line voltage or a rectified and filtered ac line voltage. Power converter 600 is coupled to receive the input voltage $V_{IN}$ 602 and provides a regulated output. In general, the output of the power converter 600 is an output voltage Vo 630, output current $I_O$ 632, or a combination of the two. On the primary side of the power converter 600 is the first power switch S1 614, which is controlled by first controller 652. The first controller 652 controls one or more switching parameters of the power switch S1 614 to control the amount energy transferred by the energy transfer element T1 606. As shown, a clamp circuit 604 is shown as coupled across an input winding 608 of the energy transfer element T1 606 and may be configured to limit the voltage on the first power switch S1 614. Further, the first controller 652 communicates with the second controller 650. As shown, the first controller 652 can receive the request signal REQ 656 via a communication link 657 from the second controller 650. The communication link 657 provides galvanic isolation using an inductive coupling, such as a transformer or a coupled inductor, an optocoupler, capacitive coupling, or other device that maintains the galvanic isolation.

The first controller 652 is configured to receive the request signal REQ 656 and outputs the first drive signal DR1 658 to control the switching of the first power switch S1 614. As will be further discussed, the request signal REQ 656 is responsive to one or more sensed outputs of the power converter 600. In one example, the first drive signal DR1 658 is a rectangular pulse waveform with varying durations of logic high and logic low sections. In one example, a logic high value in the first drive signal DR1 658 turns on the first power switch S1 614 while a logic low value turns off the first power switch S1 614. The duration of the logic high sections may be referred to as the on-time while the duration of the logic low sections may be referred to as the off-time of the first power switch S1 614. The sum of the on-time and the off-time may be referred to as the switching period, which is the inverse of the switching frequency, of the first power switch S1 614. The first controller 652 is also shown as receiving an input sense signal 615 representative of the input voltage $V_{IN}$ 602 of the power converter. In response to the input sense signal 615, the first controller 652 may vary the one or more parameters of the first drive signal DR1 658.

In one example, the first controller 652 and the second controller 650 control the first power switch S1 614 such that the input current of the power converter 600 is proportional to the input voltage $V_{IN}$ 602 by a factor that is substantially fixed throughout a half line period to maintain power factor. Further, the first controller 652 and the second controller 650 control the first power switch S1 614 to regulate the output voltage Vo 630, output current $I_O$ 632, or a combination of the two. Energy transfer element T1 606 is shown as two output windings, a first output winding 610 coupled to the first output, and a second output winding 612 coupled to the second output. Output rectifier D1 616 is coupled to the first output winding 610 while a second switch S2 620 is coupled to the output rectifier D1 615. In one example, the second switch S2 620 is a passFET however, the second switch S2 620 could also be synchronous rectifier. The switching operation of second switch S2 620 is controlled by the second controller 650 to provide a regulated output voltage Vo 620, output current $I_O$ 632, or a combination of the two, to the load 628. The second controller 650 receives multiple output sense signals to determine the switching operation of the second switch S2 620, such as the feedback signal FB 665, which is representative of the first output voltage (e.g. output voltage VO 630 across output capacitor CO 626), and the reservoir sense VR 667, which is representative of the second output voltage (e.g. reservoir voltage VRES 640 across reservoir capacitor CRES 638). The second controller 650 is also configured to receive the load sense signal IS 664, representative of a load current IL 634 of the power converter 600. As shown, resistors 622 and 624 are coupled in series across the output capacitor CO 626 and provide the feedback signal FB 665 to the secondary controller 543. Current sense resistor 636 may be coupled in series to the load 628 to provide the load current sense signal IS 664. The second controller 650 outputs a second drive signal DR2 641 which controls the switching of pass switch S2 620 to control energy delivery to the first output of power converter 600 (e.g., the voltage across output capacitor CO 626).

Power converter 600 also includes a regulator circuit 642 coupled between the multiple outputs of power converter 600. Second controller 650 includes the third controller 654 which outputs a third drive signal DR3 660, which controls the switching of third power switch S3 646 to control energy delivery from the second output of power converter 600 (e.g., reservoir capacitor CRES 638) to the first output of power converter 600 (e.g., output capacitor CO 626).

The second controller 650 is shown as including a request control 668 and second drive signal generator 671. Request control 668 is shown as configured to receive the feedback signal FB 665 and the load current sense signal IS and outputs the request signal REQ 656. The request signal REQ 656 may include request events that are generated in response to the feedback signal FB 665 and/or the load current sense signal IS and indicates that the first controller 652 should turn on the first power switch S1 614. The request signal REQ 656 may be a rectangular pulse waveform that pulses to a logic high value and quickly returns to a logic low value. The logic high pulses may be referred to as request events. The time between leading edges of the request events (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events may be responsive to the feedback signal FB 665 and/or the load current sense signal IS. However, it should be appreciated that the request control 668 could receive additional signals or even other signals which are utilized to output the request signal REQ 656.

Second drive signal generator 671 is configured to receive the feedback signal FB 665 and the load current sense signal IS 664 and generates second drive signal DR2 641. The second drive signal DR2 241 controls the turn on and the turn off of the second switch S2 620. In one example, the second drive signal DR2 241 is a rectangular pulse waveform with varying durations of logic high sections and logic low sections. The logic high sections could correspond to a switch that is turned on while logic low sections could correspond to a switch that is turned off. To regulate the output provided to load 628, the second controller 650 may vary one or more switching parameters of the second drive signal DR2 241 via the second drive signal DR2 241 in conjunction with sending the request signal REQ 656. Example parameters may include the on-time, off-time, and switching frequency/switching period.

First controller 652 and second controller 650 may be formed as part of an integrated circuit that is manufactured as either a hybrid or monolithic integrated circuit. In one example, the first power switch S1 614 may also be integrated in a single integrated circuit package with the first controller 652 and the second controller 650. In addition, in one example, first controller 652 and second controller 650 may be formed as separate integrated circuits. The first power switch S1 614 may also be integrated in the same integrated circuit as the first controller 652 or could be formed on its own integrated circuit. Further, it should be appreciated that both the first controller 652, the second controller 650, and first power switch S1 614 need not be included in a single package and may be implemented in separate controller packages or a combination of combined/separate packages.

When the instantaneous input power of the power converter 600 exceeds the demand of the load 628 (plus some loss), the second controller 650 controls the pass switch S2 620 off to prevent the output voltage Vo 630 from exceeding its desired value. When pass switch S2 620 on the first output winding 610 is open (i.e., off), surplus energy from the output produces a current in the second output winding 612 and second output rectifier D2 618 to store the surplus energy in reservoir capacitor CRES 638. As shown, the output rectifier D2 618 and reservoir capacitor CRES 638 are coupled across the second output winding 612. The reservoir voltage VRES 640 is the voltage across reservoir capacitor CRES 638 and is referenced to the output return 617. In other examples, output rectifier D2 618 may be a switch driven by second controller 650.

Regulator circuit 642 is coupled between the reservoir capacitor CRES 638 and the output capacitor CO 626. Regulator circuit 642 may be a non-isolated power converter. The example of FIG. 6 illustrates a boost converter for regulator circuit 642. However, in another example, a buck converter could also be used for regulator circuit 255. Further, the regulator circuit 642 could be controlled by a third controller 654, which is configured and functions in accordance to the teachings of the present disclosure. For the example shown, an inductor L1 644 is coupled between the reservoir capacitor CRES 638 and the third power switch S3 646. Third power switch S3 646 is coupled to output return 617 while output rectifier D3 648 is coupled to inductor L1 644 and the output capacitor CO 626. As mentioned above, regulator circuit 642 is one example of power converter 100 illustrated and discussed with respect to FIGS. 1, 2A, 2B, 3, 4, and 5. The third power switch S3 646 is one example of power switch S1 106, the inductor L1 644 is one example of energy transfer element L1 104, output rectifier D3 648 is one example of output rectifier D1 108, and output capacitor CO 626 is one example of output capacitor CO 111 of FIGS. 1, 2A, 2B, 3 and 4. It should be appreciated that the third power switch S3 646 is controlled as discussed with respect to the power switch S1 106, in accordance with embodiments of the present disclosure.

When the instantaneous input power is less than the demand of the load 628 plus the loss in the power conversion circuits, regulator circuit 642 receives current from the reservoir capacitor CRES 638 to supplement the energy delivered to the load 628. In one example, the reservoir voltage VRES 640 increases when the energy transfer element T1 606 is delivering more energy to the output of the power converter (i.e., load 628) than needed. The reservoir voltage VRES 640 is substantially constant when the energy transfer element T1 606 is delivering the energy needed to the first output of the power converter 600, and the reservoir voltage VRES 640 decreases when the energy transfer element T1 606 is not delivering the energy needed. In other words, the reservoir voltage VRES 606 decreases when the regulator circuit 642 is pulling charge from the reservoir capacitor CRES 638.

The third controller 654 is included in the second controller 650 and is configured to output the third drive signal DR3 660 to control the turn on and turn off of the third power switch S3 646. Third controller 654 is one example of the controller 118 or controller 518 as discussed above and is configured to receive the load current sense signal IS 664, constant current reference CCREF 670, and sensed reservoir voltage VR 667. Further, the load current sense signal IS 664 is one example of the output sense signal OS 116, the constant current reference CCREF 670 is one example of reference REF 126, the sensed reservoir voltage VR 667 is one example of the input voltage VIN 102, and the third drive signal DR3 660 is one example of drive signal DR 148. It should also be appreciated that the third controller 654 includes at least the regulation circuit, frequency generator and the drive signal generator discussed with respect to FIGS. 1, 2A, 2B, 3, 4, and 5 and utilizes the load current sense signal IS 664, constant current reference CCREF 670, sensed reservoir voltage VR 667 to output the third drive signal DR3 660 in accordance with the examples of the signals previously mentioned.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1

A controller for use with a power converter, comprising a regulation circuit configured to receive an output sense signal representative of an output of the power converter and a reference representative of a desired value of the output, the regulation circuit configured to output a regulation signal in response to a difference between the output sense signal and the reference; a frequency request circuit configured to receive the regulation signal and outputs an increment signal representative of a request to increase a switching frequency of a power switch of the power converter and a decrement signal representative of a request to decrease the switching frequency of the power switch in response to the regulation signal, the frequency request circuit further comprising an increase transition block configured to receive the regulation signal and output the increment signal, the increment signal asserted when the regulation signal indicates the output is less than the desired value for a duration longer than a first period; and a decrease transition block configured to receive the regulation signal and output the decrement signal, the decrement signal asserted when the regulation signal indicates the output is greater than the desired value for a duration longer than a second period; and a drive signal generator configured to receive the increment signal and the decrement signal and output a drive signal for controlling the power switch, wherein the switching frequency of the drive signal is responsive to the increment signal and the decrement signal.

Example 2

The controller of example 1, wherein the regulation circuit is a high bandwidth pulse width modulation regulation circuit and the regulation signal is substantially equal to a first value if the output sense signal is less than the reference and the regulation signal is substantially equal to a second value if the output sense signal is greater than the reference.

Example 3

The controller of examples 1 or 2, the regulation circuit further comprising a transconductance amplifier configured to receive the output sense signal and the reference; an integrator configured to receive an output of the transconductance amplifier; and a comparator configured to receive an output of the integrator and a ramp signal, wherein the regulation signal is outputted from the comparator.

Example 4

The controller of any one of examples 1 to 3, wherein the regulation circuit is a comparator and the regulation signal is substantially equal to a first value if the output sense signal is less than the reference, and the regulation signal is substantially equal to a second value if the output sense signal is greater than the reference.

Example 5

The controller of any one of examples 1 to 4, wherein the increase transition block does not assert the increment signal when the regulation signal indicates the output of the power converter is less than the desired value for a duration shorter than the first period.

Example 6

The controller of any one of examples 1 to 5, wherein the decrease transition block does not assert the decrement signal when the regulation signal indicates the output of the power converter is greater than the desired value for a duration shorter than the second period.

Example 7

The controller of any one of examples 1 to 7, wherein the first period and the second period are substantially equal.

Example 8

The controller of any one of examples 1 to 7, the drive signal generator further comprising a frequency generator configured to receive the increment signal and the decrement signal, and output a switching signal representative of the switching frequency of the power switch, wherein the switching signal is a rectangular pulse waveform with on-time sections and off-time sections corresponding to an on-time and an off-time of the power switch; and an on-time selector configured to receive the switching signal and output an on-time signal representative of the on-time of the power switch, wherein the on-time sections of the switching signal is responsive to the on-time signal.

Example 9

The controller of any one of examples 1 to 8, wherein the drive signal generator further comprises a driver coupled to receive the switching signal and output the drive signal.

Example 10

The controller of any one of examples 1 to 9, wherein the on-time selector comprises a state machine configured to determine the on-time of the power switch in response to the switching frequency provided by the switching signal.

Example 11

The controller of any one of examples 1 to 10, wherein the state machine comprises a first state with a first fixed on-time, a second state with a second fixed on-time, and a third state with a third fixed on-time, wherein the state machine transitions from the first state to the second state or from the second state to the third state when the switching frequency is substantially equal to a maximum frequency, and wherein the state machines transitions from the third state to the second state or the second state to the first state when the switching frequency is substantially equal to a minimum frequency.

Example 12

The controller of any one of examples 1 to 11, wherein the third fixed on-time is greater than the second fixed on-time and the second fixed on-time is greater than the first fixed on-time.

Example 13

The controller of any one of examples 1 to 12, wherein the switching frequency is divided by a parity factor when transitioning between the first state to the second state or between the second state to the third state, and the switching frequency is multiplied by the parity factor when transitioning between the third state to the second state or between the second state to the first state.

Example 14

The controller of any one of examples 1 to 13, further comprising a lock generator circuit configured to receive the regulation signal and at least one of the reference, the output sense signal, or an input of the power converter and output a lock signal, wherein the lock signal prevents the switching frequency from being responsive to the increment signal and the decrement signal.

Example 15

The controller of any one of examples 1 to 14, the lock generator circuit comprising a steady state transition detection circuit configured to receive the regulation signal and determine if the power converter is in a steady state condition; and a latch coupled to the steady state transition detection circuit and configured to receive at least one of the reference, the output sense signal, or the input of the power converter and output the lock signal, wherein the lock signal is asserted in response to the steady state transition detection circuit determining the power converter is in the steady state condition and the lock signal is deasserted in response to a change in at least one of the reference, the output sense signal, or the input of the power converter and output the lock signal.

Example 16

The controller of any one of examples 1 to 15, wherein the lock generator circuit deasserts the lock signal in response to a change in the reference.

Example 17

A method for controlling a power switch of a power converter, comprising receiving an output sense signal representative of an output of the power converter; determining a difference between the output sense signal and a reference representative of a desired value of the output of the power converter; determining the output is less than the desired value for a duration greater than a first period; increasing a switching frequency of the power switch in response to determining the output is less than the desired value for the duration greater than the first period; determining the output is greater than the desired value for a duration greater than a second period; and decreasing the switching frequency of the power switch in response to determining the output is greater than the desired value for the duration greater than the second period.

Example 18

The method of example 17, further comprising determining an on-time of the power switch in response to the switching frequency; increasing the on-time if the switching frequency is substantially equal to a maximum frequency; and decreasing the on-time if the switching frequency is substantially equal to a minimum frequency.

Example 19

The method of example 17 or 18, wherein increasing the on-time if the switching frequency is substantially equal to the maximum frequency further comprises setting the switching frequency to the maximum frequency divided by a parity factor.

Example 20

The method any one of examples 17 to 19, wherein decreasing the on-time if the switching frequency is substantially equal to the minimum frequency further comprises setting the switching frequency to the minimum frequency multiplied by a parity factor.

Example 21

The method of any one of examples 17 to 20, further comprising locking the switching frequency if the difference between the output sense signal and the reference indicates a steady state condition for the power converter.

Example 22

The method of any one of examples 17 to 21, further comprising unlocking the switching frequency in response to a change in at least one of the reference, the output sense signal, or an input of the power converter.

What is claimed is:
1. A controller for use with a power converter, comprising:
   a regulation circuit configured to receive an output sense signal representative of an output of the power con- verter and a reference representative of a desired value of the output, the regulation circuit configured to output a regulation signal in response to a difference between the output sense signal and the reference;
- a frequency request circuit configured to receive the regulation signal and output an increment signal representative of a request to increase a switching frequency of a power switch of the power converter and a decrement signal representative of a request to decrease the switching frequency of the power switch in response to the regulation signal, the frequency request circuit further comprising:
- an increase transition block configured to receive the regulation signal and output the increment signal, the increment signal asserted when the regulation signal indicates the output is less than the desired value for a duration longer than a first period; and
- a decrease transition block configured to receive the regulation signal and output the decrement signal, the decrement signal asserted when the regulation signal indicates the output is greater than the desired value for a duration longer than a second period; and
- a drive signal generator configured to receive the increment signal and the decrement signal and output a drive signal for controlling the power switch, wherein the switching frequency of the drive signal is responsive to the increment signal and the decrement signal.

2. The controller of claim 1, wherein the regulation circuit is a high bandwidth pulse width modulation regulation circuit and the regulation signal is substantially equal to a first value if the output sense signal is less than the reference and the regulation signal is substantially equal to a second value if the output sense signal is greater than the reference.

3. The controller of claim 2, the regulation circuit further comprising:
- a transconductance amplifier configured to receive the output sense signal and the reference;
- an integrator configured to receive an output of the transconductance amplifier; and
- a comparator configured to receive an output of the integrator and a ramp signal, wherein the regulation signal is outputted from the comparator.

4. The controller of claim 1, wherein the regulation circuit is a comparator and the regulation signal is substantially equal to a first value if the output sense signal is less than the reference, and the regulation signal is substantially equal to a second value if the output sense signal is greater than the reference.

5. The controller of claim 1, wherein the increase transition block does not assert the increment signal when the regulation signal indicates the output of the power converter is less than the desired value for a duration shorter than the first period.

6. The controller of claim 1, wherein the decrease transition block does not assert the decrement signal when the regulation signal indicates the output of the power converter is greater than the desired value for a duration shorter than the second period.

7. The controller of claim 1, wherein the first period and the second period are substantially equal.

8. The controller of claim 1, the drive signal generator further comprising:
- a frequency generator configured to receive the increment signal and the decrement signal, and output a switching signal representative of the switching frequency of the power switch, wherein the switching signal is a rectangular pulse waveform with on-time sections and off-time sections corresponding to an on-time and an off-time of the power switch; and
- an on-time selector configured to receive the switching signal and output an on-time signal representative of the on-time of the power switch, wherein the on-time sections of the switching signal is responsive to the on-time signal.

9. The controller of claim 8, wherein the drive signal generator further comprises a driver coupled to receive the switching signal and output the drive signal.

10. The controller of claim 8, wherein the on-time selector comprises a state machine configured to determine the on-time of the power switch in response to the switching frequency provided by the switching signal.

11. The controller of claim 10, wherein the state machine comprises a first state with a first fixed on-time, a second state with a second fixed on-time, and a third state with a third fixed on-time, wherein the state machine transitions from the first state to the second state or from the second state to the third state when the switching frequency is substantially equal to a maximum frequency, and wherein the state machines transitions from the third state to the second state or the second state to the first state when the switching frequency is substantially equal to a minimum frequency.

12. The controller of claim 11, wherein the third fixed on-time is greater than the second fixed on-time and the second fixed on-time is greater than the first fixed on-time.

13. The controller of claim 11, wherein the switching frequency is divided by a parity factor when transitioning between the first state to the second state or between the second state to the third state, and the switching frequency is multiplied by the parity factor when transitioning between the third state to the second state or between the second state to the first state.

14. The controller of claim 1, further comprising a lock generator circuit configured to receive the regulation signal and at least one of the reference, the output sense signal, or an input of the power converter and output a lock signal, wherein the lock signal prevents the switching frequency from being responsive to the increment signal and the decrement signal.

15. The controller of claim 14, the lock generator circuit comprising:
- a steady state transition detection circuit configured to receive the regulation signal and determine if the power converter is in a steady state condition; and
- a latch coupled to the steady state transition detection circuit and configured to receive at least one of the reference, the output sense signal, or the input of the power converter and output the lock signal, wherein the lock signal is asserted in response to the steady state transition detection circuit determining the power converter is in the steady state condition and the lock signal is deasserted in response to a change in at least one of the reference, the output sense signal, or the input of the power converter and output the lock signal.

16. The controller of claim 14, wherein the lock generator circuit deasserts the lock signal in response to a change in the reference.

17. A method for controlling a power switch of a power converter, comprising:
- receiving an output sense signal representative of an output of the power converter;
- determining a difference between the output sense signal and a reference representative of a desired value of the output of the power converter;

determining if the output is less than the desired value for a duration greater than a first period;

keeping a switching frequency of the power switch constant in response to determining that the output is less than the desired value for a duration less than the first period;

increasing the switching frequency of the power switch in response to determining that the output is less than the desired value for the duration greater than the first period;

determining if the output is greater than the desired value for a duration greater than a second period;

keeping the switching frequency of the power switch constant in response to determining that the output is greater than the desired value for a duration less than the second period; and decreasing the switching frequency of the power switch in response to determining that the output is greater than the desired value for the duration greater than the second period.

18. The method of claim 17, further comprising:

determining an on-time of the power switch in response to the switching frequency;

increasing the on-time if the switching frequency is substantially equal to a maximum frequency; and decreasing the on-time if the switching frequency is substantially equal to a minimum frequency.

19. The method of claim 18, wherein increasing the on-time if the switching frequency is substantially equal to the maximum frequency comprises setting the switching frequency to the maximum frequency divided by a parity factor.

20. The method of claim 18, wherein decreasing the on-time if the switching frequency is substantially equal to the minimum frequency comprises setting the switching frequency to the minimum frequency multiplied by a parity factor.

21. The method of claim 17, further comprising:

determining a steady state condition when the output is less than the desired value for the duration less than the first period followed by the output being greater than the desired value for the duration less than the second period; and locking the switching frequency to a determined value if the difference between the output sense signal and the reference indicates the steady state condition for the power converter.

22. The method of claim 21, further comprising:

unlocking the switching frequency from the determined value in response to a change in at least one of the reference, the output sense signal, or an input of the power converter.

\* \* \* \* \*